United States Patent [19]

Nakajima et al.

[11] Patent Number: 5,107,036

[45] Date of Patent: Apr. 21, 1992

[54] CURING AGENT FOR EPOXY RESIN

[75] Inventors: Nobuyuki Nakajima; Shuichi Kanagawa; Hideshi Sakamoto; Noriaki Saito; Tadashi Ikushima, all of Niihama, Japan

[73] Assignee: Sumitomo Chemical Company, Limited, Osaka, Japan

[21] Appl. No.: 602,680

[22] Filed: Oct. 24, 1990

[30] Foreign Application Priority Data

Oct. 25, 1989 [JP] Japan .................. 1-279407

[51] Int. Cl.⁵ .............. C07C 37/20; C07C 39/16; C08G 59/00
[52] U.S. Cl. .................... 568/727; 528/86; 528/87; 568/722; 568/728; 568/763
[58] Field of Search ............ 568/717, 718, 727, 722, 568/728, 763; 528/87, 86

[56] References Cited

U.S. PATENT DOCUMENTS

| | | | |
|---|---|---|---|
| 2,807,653 | 9/1957 | Filbey et al. | 568/727 |
| 3,832,409 | 8/1974 | Endres et al. | 568/727 |
| 4,895,988 | 1/1990 | Clerisi et al. | 568/727 |

FOREIGN PATENT DOCUMENTS

| | | | |
|---|---|---|---|
| 56-98227 | 8/1981 | Japan | 568/727 |
| 0035532 | 2/1982 | Japan | 568/727 |
| 8198526 | 11/1983 | Japan . | |
| 2119220 | 5/1987 | Japan | 568/727 |
| 2212420 | 9/1987 | Japan . | |
| 63-22824 | 1/1988 | Japan | 528/87 |
| 3215651 | 8/1988 | Japan | 568/727 |
| 3225621 | 9/1988 | Japan | 568/727 |
| 3254123 | 10/1988 | Japan . | |
| 3275620 | 11/1988 | Japan | 568/727 |
| 3301218 | 12/1988 | Japan | 568/727 |
| 1101658 | 4/1989 | Japan | 528/87 |
| 1131273 | 5/1989 | Japan . | |

Primary Examiner—Werren B. Lone
Attorney, Agent, or Firm—Birch, Stewart, Kolasch & Birch

[57] ABSTRACT

A curing agent for an epoxy resin comprising (A) a polyhydric phenol obtainable by condensing a phenol compound and a hydroxybenzaldehyde and (B) a dihydric phenol, which gives a cured material of an epoxy resin having improved moisture and heat resistance and a small coefficient of linear thermal expansion.

16 Claims, No Drawings

CURING AGENT FOR EPOXY RESIN

BACKGROUND OF THE INVENTION

1. Field of the Invention

The present invention relates to a curing agent for an epoxy resin. More particularly, the present invention relates to a curing agent for an epoxy resin which is widely used in casting, molding, laminating or coating or as an adhesive.

2. Description of the Related Art

An epoxy resin has various excellent properties such as adhesivity, processability and solvent resistance, and finds wide variety of applications.

With recent rapid progress of technology, it is highly desired for the epoxy resin to have much higher performances, in particular, heat resistance in various fields.

Methods for improving the heat resistance of the epoxy resin composition include improvement of the epoxy resin itself and improvement of a curing agent.

As the curing agent for the epoxy resin, amine compounds, acid anhydrides, phenol compounds and the like are known.

In general, when the amine compound is used as the curing agent, the cured epoxy resin has poor water resistance, and the amine compound is toxic.

The acid anhydride has a low curing rate, and the cured epoxy resin has poor water resistance and adhesivity.

In place of such curing agents, hydroxy novolak is used particularly in the molding material field since it has balanced heat resistance and water resistance.

With the recent progress of semiconductor technology, the phenol novolak type curing agent cannot impart satisfactory heat resistance to the cured epoxy resin in some applications.

For example, as an encapsulant for an electronic device such as an IC, a curing system in which glycidyl ether of o-cresol novolak is cured with hydroxy novolak is mainly used. Recently, a degree of integration of the IC increases and the ICs encapsulated by the epoxy resin compositions have been surface-mounted and directly submerged in a solder bath. The epoxy resin compositions for encapsulating electronic components are desired to have improved heat resistance.

As a curing agent for an epoxy resin which intends to impart good heat resistance to a cured product, various improvements of the phenol novolak type curing agents have been proposed.

First, it has been proposed to decrease a content of low molecular weight compounds, namely dinucleic compounds in the phenol novolak type curing agent or the epoxy resin.

For example, Japanese Patent Kokai Publication No. 212410/1987 describes that decrease of a content of dinucleic compounds in the novolak resin provides a thermosetting resin composition having better heat resistance and moisture resistance.

Further, the following Japanese Patent Kokai Publications intend to improve the heat resistance through decrease of the content of dinucleic compounds in the phenol novolak or the epoxy resin:

Japanese Patent Kokai Publication Nos. 98227/1981, 119220/1987, 301218/1988, 275620/1988, 225621/1988, 254123/1988, 81118/1988, 24818/1989, 64821/1989, 129055/1989 and 131273/1989.

As to the improvement of the heat resistance of curing agents for the epoxy resin, Japanese Patent Kokai Publication Nos. 198526/1983 and 22824/1988 disclose tris(hydroxyphenyl)methane and a condensation product of a phenol and salicylaldehyde.

The methods for decreasing the content of dinucleic compounds as disclosed in Japanese Patent Kokai Publication No. 212420/1987 and the like do not give a chemical structure which is substantially different from the conventional technique and the heat resistance is not sufficiently improved.

Since the improvement of heat resistance of the cured material of the epoxy resin usually increases a so-called called free volume, the moisture resistance tends to decrease and/or a coefficient of linear thermal expansion tends to increase.

The invention of Japanese Patent Kokai Publication No. 198526/1983 intends to improve the heat resistance through change of the chemical structure but the improvement is still insufficient and the moisture resistance is poor.

The invention of Japanese Patent Kokai Publication No. 22824/1988 does not improve the heat resistance and moisture resistance sufficiently and further improvement is desired.

SUMMARY OF THE INVENTION

An object of the present invention is to provide a curing agent for an epoxy resin, which agent can provide a cured material of epoxy resin having improved heat resistance and moisture resistance that are well balanced.

According to the present invention, there are provided a curing agent for an epoxy resin, which agent comprises (A) a polyhydric phenol obtainable by condensing a phenol compound and a hydroxybenzaldehyde and (B) a dihydric phenol, and an epoxy resin curable composition comprising said curing agent and an epoxy compound having at least two glycidyl groups in a molecule.

DETAILED DESCRIPTION OF THE INVENTION

The phenol used to provide the polyhydric phenol (A) is one having at least one phenolic hydroxyl group in a molecule. Examples are phenol, mono-substituted phenols (e.g. o-cresol, m-cresol, p-cresol, ethylphenol, n-propylphenol, isopropylphenol, tert.-butylphenol, octylphenol, nonylphenol, phenylphenol, etc.), di-substituted phenols (e.g. xylenol, methylpropylphenol, methylbutylphenol, methylhexylphenol, dipropylphenol, dibutylphenol, etc.), and tri-substituted phenols (e.g. trimethylphenol, etc.); naphthols (e.g. naphthol, methylnaphthol, etc.); and dihydric phenols (e.g. catechol, hydroquinone, bisphenol A, bisphenol F, bisphenol AD, biphenol, etc.). Among them, the substituted phenols having a hydrophobic substituent are preferred in view of the moisture resistance.

To impart flame retardance to the phenols, a halogen atom such as a chlorine atom and a bromine atom may be introduced in the molecule.

The phenols can be used independently or as a mixture thereof.

The hydroxybenzaldehyde used herein is intended to mean a hydroxybenzaldehyde in which a hydroxyl group and an aldehyde group are bonded to a benzene ring. The benzene ring may be substituted with at least one other substituent such as an alkoxy group (e.g. methoxy, ethoxy, butoxy, etc.), an alkyl group (e.g.

methyl, ethyl, propyl, butyl, etc.), and a halogen atom (e.g. a chlorine atom and a bromine atom). Those having the alkyl group further improves moisture resistance of the cured material, while those having the halogen atom imparts flame retardance to the cured material. Specific examples of the hydroxybenzaldehyde are p-hydroxybenzaldehyde, vanillin, isovanillin, salicylaldehyde, etc. They may be used independently or as a mixture thereof. Among them, p-hydroxybenzaldehyde is preferred.

Insofar as the properties of the cured epoxy resin such as heat resistance and moisture resistance are not deteriorated, a small amount of other compound such as aldehydes (e.g. formaldehyde, acetaldehyde, crotonaldehyde, acrolein, glyoxal, glutaraldehyde, benzaldehyde, etc.) and ketones (e.g. acetone, methyl ethyl ketone, methyl isobutyl ketone, etc.) may be used together with the hydroxybenzaldehyde.

The condensation reaction between the phenol and the hydroxybenzaldehyde can be carried out by a per se conventional method.

That is, in the presence of an acid catalyst for novolak synthesis such as an inorganic acid (e.g. hydrochloric acid, sulfuric acid, etc.), an organic acid (e.g. toluenesulfonic acid, etc.) and zinc acetate, the phenol and the hydroxybenzaldehyde are heated.

Through the condensation reaction, a trinuclear compound consisting of two molecules of the phenol compound and one molecule of the hydroxybenzaldehyde is mainly produced. In addition, an oligomer comprising a repeating unit consisting of a pair of one molecule of the phenol compound and one molecule of the hydroxybenzaldehyde is produced. In case of the above trinuclear compound, the number of the repeating units is 0 (zero).

As the number of the repeating units increases, the heat resistance of the cured material of the epoxy resin increases.

To increase the number of the repeating units, the ratio of the hydroxybenzaldehyde and the amount of the catalyst are increased.

The dihydric phenol (B) may be any of phenols having two phenolic hydroxyl groups in a molecule. Examples of the dihydric phenol are catechol, resorcinol, hydroquinone, bisphenol A, bisphenol F, bisphenol AD, biphenol and the like. To further improve water resistance of the cured material, an alkyl group may be introduced in the phenol, and to impart flame retardance, a halogen atom may be introduced in the phenol. The dihydric phenols may be used independently or as a mixture.

An amount of the dihydric phenol varies with its kind and/or the kind of the polyhydric phenol with which the dihydric phenol is condensed, and usually 5 to 50% by weight, preferably 15 to 40% by weight based on the weight of the curing agent.

The curing agent of the present invention may be used as a mixture of the phenols (A) and (B), or the phenols (A) and (B) are independently added to the epoxy resin to be cured to form a homogeneous composition.

The curing agent of the present invention may be modified with an acid-terminated nitrile rubber or a silicone to impart other properties such as low stress to the cured material.

As the epoxy compound having at least two glycidyl groups which is to be cured with the curing agent of the present invention, any of known epoxy resins is used.

Specific examples of the epoxy resin are glycidyl ethers of diphenols (e.g. bisphenol A, bisphenol F, bisphenol AD, brominated bisphenol A, resorcinol, hydroquinone, etc.); glycidyl ethers of phenol novolak, cresol novolak, resorcinol novolak, trihydroxyphenylmethane, trihydroxyphenylethane, trihydroxyphenylpropane, tetrahydroxyphenylethane, polyvinylphenol and polyisopropenylphenol; glycidyl ethers of polyhydric phenols which are prepared by a condensation reaction of phenols and aromatic carbonyl compounds; glycidyl amines of diaminodiphenylmethane and aminophenol; alicyclic epoxy resins such as vinylcyclohexenedioxide, alicyclic diepoxyacetal and alicyclic epoxy carboxylate; and heterocyclic epoxy resins such as hydantoin type epoxy resins and triglycidyl isocyanurate. The epoxy resin may be modified by a conventional method.

In the composition, the curing agent of the present invention is used in an amount of 0.2 to 1.5 equivalents of phenolic hydroxyl groups per one glycidyl group.

The curing agent for the present invention can be used as a mixture with other well known curing agent such as phenol novolak, amine compounds and acid anhydrides. In particular, the mixture with the phenol novolak has good moldability.

The composition comprising the epoxy resin and the curing agent of the present invention may further contain conventionally used additives such as other well known a filler, a curing accelerator, a mold release agent, a flame retardant, a coupling agent and the like.

To encapsulate the electronic device such as a semiconductor with the composition comprising the epoxy resin and the curing agent of the present invention, any of conventional molding methods such as transfer molding, compression molding or injection molding may be employed. In particular, when the epoxy resin composition is in the liquid state, casting, dipping or dropping can be used.

When the epoxy resin composition of the present invention is used as a material of a laminate, it is homogeneously dissolved in a solvent (e.g. methyl ethyl ketone, toluene, ethyleneglycolmonomethylether, etc.), a resulting solution is impregnated in glass fibers or organic fibers and dried by heating to form a prepreg, and then the prepreg is press molded.

The epoxy resin composition comprising the curing agent of the present invention has good flowability and moldability before curing, and the cured material therefrom has improved moisture resistance and a small coefficient of linear thermal expansion while maintaining high heat resistance.

PREFERRED EMBODIMENTS OF THE INVENTION

The present invention will be illustrated by following Examples.

In Examples, the average number of repeating units was measured and calculated by using a gel permeation chromatograph (TRI ROTAR SR-II manufactured by Nippon SpectroIndustry Co., Ltd.).

Evaluated properties of the cured epoxy resin article and methods for evaluating them are as follows:

Glass Transition Temperature

A glass transition temperature is measured with a thermomechanical analyzer (TMA 10 manufactured by Seiko Electronic Industries).

Coefficient of Linear Thermal Expansion

With the same thermomechanical analyzer as used in the above, a coefficient of linear thermal expansion is measured at a temperature 70° C. lower than the glass transition temperature.

Water Absorption (Pressure Cooker Test)

From a press molded article, two sample pieces (each 20 mm×25 mm×2 mm) are cut out, placed in a high pressure vapor environmental tester (PC-305 S manufactured by Hirayama Seisakusho Co., Ltd.) and heated at 121° C. under 2 Atm. for 20 hours. Then, weight gain of the sample is measured and expressed in percentages.

The water absorption is a criterion for evaluating the moisture resistance.

Preparation Examples 1-7

To a reactor equipped with a thermometer, a stirrer and a condenser, a phenol and an aldehyde shown in Table 1 were charged in amounts indicated in Table 1. Then, as a catalyst, p-toluenesulfonic acid monohydrate (1.0 g) was added. The mixture was heated at 95° to 105° C. while stirring.

After confirming disappearance of hydroxybenzaldehyde with GPC (gel permeation chromatography), the reaction mixture was neutralized with a 10% sodium hydroxide aqueous After washing the reaction mixture with water five times, the unreacted monomers were evaporated off to obtain a desired polyhydric phenol.

The average number of the repeating units of polyhydric phenol was measured.

The results are shown in Table 1.

TABLE 1

| Preparation Example No. | Phenol compound (g) | Aldehyde (g) | Av. No. of repeating units |
|---|---|---|---|
| 1 | o-Cresol (108) | p-Hydroxy-benzaldehyde ↑ (61) | 2.1 |
| 2 | m-Cresol (108) | ↑ (61) | 2.5 |
| 3 | p-Creson (108) | ↑ (61) | 4.2 |
| 4 | Phenol (94) | ↑ (61) | 3.3 |
| 5 | o-Isopropyl-phenol (136) | ↑ (61) | 1.8 |
| 6 | o-n-Propyl-phenol (136) | ↑ (61) | 2.3 |
| 7 | p-tert.-Butyl-phenol (150) | ↑ (61) | 2.3 |

EXAMPLES 1-7 AND COMPARATIVE EXAMPLES 1 AND 2

The glycidyl ether of polyphenol which was prepared by condensation of a phenol and hydroxybenzaldehyde (Sumiepoxy (trade mark) ESX-221, an epoxy equivalent of 210) (210 g) as an epoxy resin, the polyhydric phenol and the dihydric phenol shown in Table 2 as a curing agent and triphenylphosphine (3.2 g) as a curing accelerator were heated and compounded on rolls and press molded at 175° C. for 5 minutes. Then, the molded article was post cured in an oven at 180° C. for 5 hours to obtain a cured molded article.

The glass transition temperature ($T_g$), the coefficient of linear thermal expansion and water absorption of the cured molded article were measured.

The results are shown in Table 2.

TABLE 2

| Example No. | Polyhydric phenol (A) Prep. Ex. No. (g) | Dihydric phenol (B) (g) | $T_g$ (°C.) | Coefficient of linear thermal expansion ×10$^{-5}$/°C. | Water Absorption (wt. %) |
|---|---|---|---|---|---|
| 1 | Prep. Ex. 1 (76.3 g) | Bisphenol A (32.7 g) | 218 | 7.0 | 1.4 |
| 2 | Prep. Ex. 2 (73.5 g) | Bisphenol F (31.5 g) | 225 | 6.7 | 1.3 |
| 3 | Prep. Ex. 3 (74.9 g) | Bisphenol AD (32.1 g) | 221 | 6.6 | 1.6 |
| 4 | Prep. Ex. 4 (68.6 g) | Bisphenol F (29.4 g) | 230 | 6.7 | 1.7 |
| 5 | Prep. Ex. 5 (96.0 g) | Bisphenol F (24.0 g) | 219 | 7.2 | 1.4 |
| 6 | Prep. Ex. 6 (69.0 g) | Bisphenol F (46.0 g) | 215 | 6.9 | 1.3 |
| 7 | Prep. Ex. 7 (72.6 g) | Bisphenol F (48.4 g) | 216 | 7.0 | 1.3 |
| 8 | Prep. Ex. 1 (84.8 g) | Bisphenol F (21.2 g) | 219 | 7.1 | 1.5 |
| 9 | Prep. Ex. 2 (66.0 g) | Bisphenol A (44.0 g) | 220 | 6.9 | 1.3 |
| 10 | Prep. Ex. 2 (85.6 g) | Bisphenol AD (21.4 g) | 222 | 6.8 | 1.6 |
| Com. Ex. 1 | *1) (106.0 g) | — | 196 | 7.3 | 2.1 |
| Com. Ex. 2 | Prep Ex. 1 | — | 220 | 9.2 | 2.0 |

Note:
*) Phenol novolak (Tamanol manufactured by Arakawa Chemical Co., Ltd., Softening point: 95° C.).

What is claimed is:

1. A curing agent for an epoxy resin, which agent comprises (A) a polyhydric phenol obtainable by condensing a phenol compound and a hydroxybenzaldehyde and (B) a dihydric phenol.

2. The curing agent for an epoxy resin according to claim 1, wherein said phenol to be condensed with said phenol compound is at least one selected from the group consisting of phenol, o-cresol, m-cresol, p-cresol, ethylphenol, n-propylphenol, isopropylphenol, tert,-butylphenol, octylphenol, nonylphenol, phenylphenol, xylenol, methylpropylphenol, methylbutylphenol, methylhexylphenol, dipropylphenol, dibutylphenol, trimethylphenol, naphthol, methylnaphthol, catechol, hydroquinone, bisphenol A, bisphenol F, bisphenol AD and biphenol.

3. The curing agent for an epoxy resin according to claim 1, wherein said dihydric phenol (B) is at least one selected from the group consisting of catechol, resorcinol, hydroquinone, bisphenol A, bisphenol F, bisphenol AD and biphenol.

4. The curing agent for an epoxy resin according to claim 1, wherein an amount of said dihydric phenol (B) is from 5 to 50% by weight based on the weight of the curing agent.

5. An epoxy resin curable composition comprising a curing agent which comprises (A) a polyhydric phenol obtainable by condensing a phenol compound and a hydroxybenzaldehyde and (B) a dihydric phenol, and an epoxy compound having at least two glycidyl groups in a molecule.

6. The epoxy resin curable composition according to claim 5, which contains said curing agent in an amount of 0.2 to 1.5 equivalents of phenolic hydroxyl groups per one glycidyl group.

7. The curing agent for an epoxy resin according to claim 1, wherein said dihydric phenol (B) is at least one selected from the group consisting of catechol, resorcinol, hydroquinone, bisphenol A, bisphenol F, bisphenol AD and biphenol.

8. The curing agent for an epoxy resin according to claim 3, wherein an amount of said dihydric phenol (B) is from 5 to 50% by weight based on the weight of the curing agent.

9. The curing agent for an epoxy resin according to claim 8, wherein an amount of said dihydric phenol (B) is from 5 to 50% by weight based on the weight of the curing agent.

10. The curing agent for an epoxy resin according to claim 1, wherein the benzene ring of said hydroxybenzaldehyde is substituted with at least a substituent selected from the group consisting of methoxy, ethoxy, butoxy, methyl, ethyl, propyl, butyl, chlorine and bromine.

11. The curing agent for an epoxy resin according to claim 1, wherein said hydroxybenzaldehyde is selected from the group consisting of p-hydroxybenzaldehyde, vanillin, isovanillin, salicylaldehyde and mixtures thereof.

12. The curing agent for an epoxy resin according to claim 1, wherein said hydroxybenzaldehyde is p-hydroxybenzaldehyde.

13. The curing agent for an epoxy resin according to claim 1, wherein an amount of said dihydric phenol (B) is from 15 to 40% by weight based on the weight of the curing agent.

14. The curing agent for an epoxy resin according to claim 1, wherein said phenol to be condensed with said hydroxybenzaldehyde is at least one selected from the group consisting of o-cresol, m-cresol, p-cresol, phenol, o-isopropylphenol, o-n-propylphenol and p-tert.-butylphenol.

15. The curing agent for an epoxy resin according to claim 1, wherein said dihydric phenol (B) is at least one selected from the group consisting of bisphenol A, bisphenol AD and bisphenol F.

16. The curing agent for an epoxy resin according to claim 14, wherein said dihydric phenol (B) is at least one selected from the group consisting of bisphenol A, bisphenol AD and bisphenol F.

* * * * *